Feb. 29, 1944. L. W. ROSER 2,342,757
NOZZLE
Filed April 20, 1940

INVENTOR
LESLIE W. ROSER
BY Christian R Nielsen
ATTORNEY

Patented Feb. 29, 1944

2,342,757

UNITED STATES PATENT OFFICE 2,342,757

NOZZLE

Leslie W. Roser, Milwaukee, Wis.

Application April 20, 1940, Serial No. 330,759

5 Claims. (Cl. 299—73)

My invention relates to nozzles and more particularly to a nozzle that may be applied to the end of a hose for placer mining, fire fighting or spraying with water or any other type of liquid.

The object of my invention is to provide a nozzle that may be adjusted in any direction without disconnecting the nozzle from its point of attachment.

Another object of my invention is to provide a means of mounting a plurality of nozzles to one manifold or head and permitting each nozzle to be adjustably set in any direction without any effect on the remaining nozzles.

A still further object of my invention is to provide a means of permitting independent adjustment without effecting the water tight seal while the adjustment takes place.

Still another object of my invention is to provide independent adjustable means that may be made applicable to any type of nozzle, thereby giving the device a large variation in its use.

Figure 1:
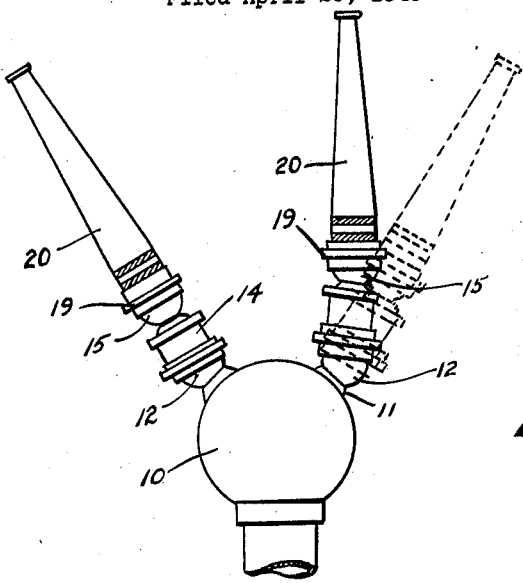

Other and further objects of my invention will become more apparent as the description proceeds when taken in conjunction with the drawing in which Figure 1 is a perspective view of the device showing a manifold or head equipped with two adjustable nozzles, each independent of the other.

Figure 2:
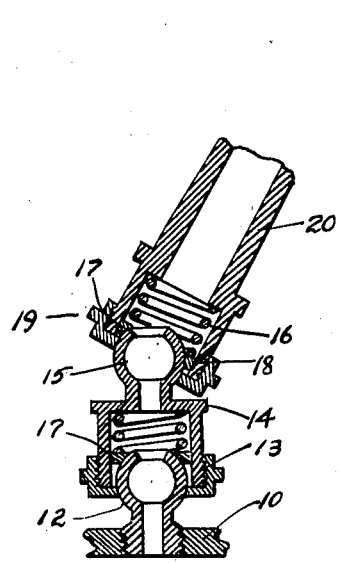
Figure 3:
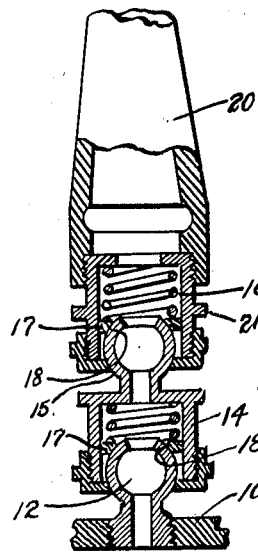

Figure 2 is a fragmentary cross-sectional view of the ball and socket arrangement that permits adjustment yet provides a permanent seal due to the spring tension against the ground washers, and Figure 3 is a cross-sectional fragmentary view of the device arranged in a manner that will permit the adoption of a conventional adjustable nozzle.

Similar characters of reference indicate corresponding parts throughout the several views and referring now to the same the character 10 shows a spherical enclosure acting as a manifold or reservoir onto which are attached two adjustable nozzles. The number of nozzles however is not limited to two as any number can be applied depending on the size of the sphere or if another shape of manifold is employed the shape would determine the number of nozzles.

The nozzles as shown are attached to the enclosure 10 at any predetermined angle by means of a threaded member 11 being of tubular construction and terminating into a ball or spherical section 12. Immediately adjacent this ball member 12 and encircling it is a collar member 13 provided wtih an inner thread disposed for engagement with a housing 14 which housing also terminates into a spherical ball member 15. The housing member 14 is provided with an outer thread for engagement with the collar member 13 and the inner chamber of the member 14 encloses a resilient member 16 disposed for forcing a ground washer 17 against the surface of the ball member 12 thereby forming a liquid proof seal at 18 against the face of the ball 12. The ball member 15 is also provided with a collar 19 provided with an inner thread disposed for engagement with the outer thread of a nozzle member 20. This member 20 is also provided with a chamber enclosing a resilient member 16 engaging the ground washer 17 and form a seal 18 against the ball member 15. Obviously the arrangement shown provides a liquid tight seal at 18, yet permits the adjustment of the nozzle 20 to a 90° angle. In Figure 3 is shown a similar arrangement in which there is a member 21 replacing the nozzle 20 and due to the outer threads on the member 21 permits attachment of any conventional type of standard hose nozzle. This arrangement would especially find favor where a spray nozzle is employed.

The device permits a free flow of liquid without any interference to the nozzle and the general contour and size of the enclosure 10 would determine how many nozzles could be applied.

Although I have shown and described a particular construction of my device it is to be understood that I can make such changes as I deem necessary without departing from the spirit of my invention as set forth in the appended claims.

What I claim and desire to secure by Letters Patent in the United States is:

1. A device of the character described comprising in combination with a manifold, a ball having an opening therethrough, a socket member provided with an external thread, said socket member having an opening therethrough, a threaded member provided with an inner thread encircling said ball, said threaded member engaging said socket member, an annular washer having a surface ground to the contour of said ball disposed against the surface of said ball, a resilient member disposed inside of said socket member for engagement with and urging said washer toward said ball, and means for attaching a nozzle onto said socket member to enable the dispensing of liquid.

2. A device of the character described comprising in combination with a manifold, a ball member having an opening therethrough, said ball member arranged for attachment to said manifold, a socket member threaded on its outer face having an opening therethrough, a threaded member encircling said ball member, said threaded member provided with an inner thread for engagement with said socket member, an annular washer having a surface ground to the contour of said ball member, a resilient member, said washer and resilient member encased in said socket member and held in proper alignment so that said resilient member urges said washer against the surface of said ball member, and means for attaching a nozzle to the depending threaded end of said socket member to allow free flow of liquid through the assembled device.

3. A nozzle device of the character described comprising in combination with a manifold, a plurality of tubular ball members, collars provided with inner threads encircling said ball members, corresponding number of tubular socket members provided with an external thread, adapted to receive the inner thread of said collars, resilient members within the enclosure of said socket members, annular washers having one surface conforming with the contour of said ball members, said resilient members urging said annular washers against said ball members within the chamber of said socket members, and means for attaching a nozzle to the depending end of one of said socket members thereby permitting free flow of liquid through the assembled device with the nozzle at any pre-determined angle due to the plurality of ball and socket joints.

4. A device of the character described comprising in combination a tubular ball member, said ball member provided with means for attaching to a liquid supply, a tubular socket member threaded on its outer face, an internally threaded collar member encircling said ball member, said threaded member arranged for engagements with said socket member, an annular washer having one surface ground to the contour of said ball member, a resilient member, said washer and said resilient member disposed within the chamber of said socket member in a manner whereby said resilient member urges said washer against the outer surface of said ball member, and means for attaching a nozzle to the depending end of said socket member to allow free flow of liquid through the assembled device.

5. A device of the character described comprising in combination with a manifold, a plurality of ball members of tubular construction, threadedly engaging said manifold, tubular socket members threaded externally on one end and provided with ball members on the other end, threaded collar members encircling said ball members, said threaded collar members provided with an inner thread arranged for engagement with said socket members, annular washers having one surface shaped to the contour of said ball members, resilient means, said washers and resilient means assembled into the chamber of said socket members in a manner whereby said resilient means urge said washers against the outer surface of said ball members, said socket members and collars corresponding in number to said ball members, and means on the depending socket members for attaching nozzles to permit the dispensing of liquid through a plurality of nozzles which may be individually placed in any predetermined angle.

LESLIE W. ROSER.